US011757771B2

(12) United States Patent
Claude et al.

(10) Patent No.: US 11,757,771 B2
(45) Date of Patent: Sep. 12, 2023

(54) METHOD FOR ROUTING PACKETS IN A COMMUNICATION NETWORK HAVING A VARIABLE AND PREDICTABLE TOPOLOGY

(71) Applicant: AIRBUS DEFENCE AND SPACE SAS, Toulouse (FR)

(72) Inventors: Bertrand Claude, Toulouse (FR); Raphaël Ihamouine, Toulouse (FR); Antoine Auger, Toulouse (FR)

(*) Notice: Subject to any disclaimer, the term of this patent is extended or adjusted under 35 U.S.C. 154(b) by 0 days.

(21) Appl. No.: 17/927,672

(22) PCT Filed: May 25, 2021

(86) PCT No.: PCT/EP2021/063928
§ 371 (c)(1),
(2) Date: Nov. 23, 2022

(87) PCT Pub. No.: WO2021/239740
PCT Pub. Date: Dec. 2, 2021

(65) Prior Publication Data
US 2023/0179514 A1 Jun. 8, 2023

(30) Foreign Application Priority Data
May 25, 2020 (FR) ....................................... 2005483

(51) Int. Cl.
*H04L 45/50* (2022.01)
*H04L 45/24* (2022.01)
*H04L 45/745* (2022.01)

(52) U.S. Cl.
CPC .............. *H04L 45/50* (2013.01); *H04L 45/24* (2013.01); *H04L 45/745* (2013.01)

(58) Field of Classification Search
CPC ....... H04L 45/50; H04L 45/24; H04L 45/247; H04L 45/745; H04W 40/30; H04Q 2213/13552
See application file for complete search history.

(56) References Cited

U.S. PATENT DOCUMENTS

| 9,106,568 | B2 * | 8/2015 | Heo ....................... H04L 45/24 |
| 2019/0190821 | A1 | 6/2019 | Van Wambeke et al. |
| 2022/0141121 | A1 * | 5/2022 | Yin ......................... H04L 45/34 370/255 |

FOREIGN PATENT DOCUMENTS

| CN | 110518959 | 11/2019 | |
| CN | 110995599 A * | 4/2020 | ......... H04B 7/18521 |

(Continued)

OTHER PUBLICATIONS

A. Giorgetti, et al., "Segment routing for effective recovery and multi-domain traffic engineering", Journal of Optical Communications and Networking, Institute of Electrical and Electronics Engineers, US, vol. 9, No. 2, Feb. 1, 2017, pp. A223-A232 (10 pages).

(Continued)

Primary Examiner — Saad A. Waqas
(74) Attorney, Agent, or Firm — Nixon & Vanderhye P.C.

(57) ABSTRACT

A method (100) for routing packets in a communication network (10) having a variable and predictable topology. The network includes a plurality of nodes, and each node can be connected, at least temporarily, to one or more other nodes in the network. The packets are transmitted from a source node (21) to a destination node (23). An orchestration entity (25) determines (101) a plurality of temporary paths (31) between the source node and the destination node for several successive time periods (Pi), the existence of a temporary path being guaranteed for the time period with which it is associated. The orchestration entity (25) generates (102) a table (T) of label stacks (LSi), in which table each label stack corresponds to the temporary path defined for one of the successive time periods, and each label (Lj, i) corresponds to a node of the temporary path.

14 Claims, 7 Drawing Sheets

(56) References Cited

FOREIGN PATENT DOCUMENTS

Figure 1:
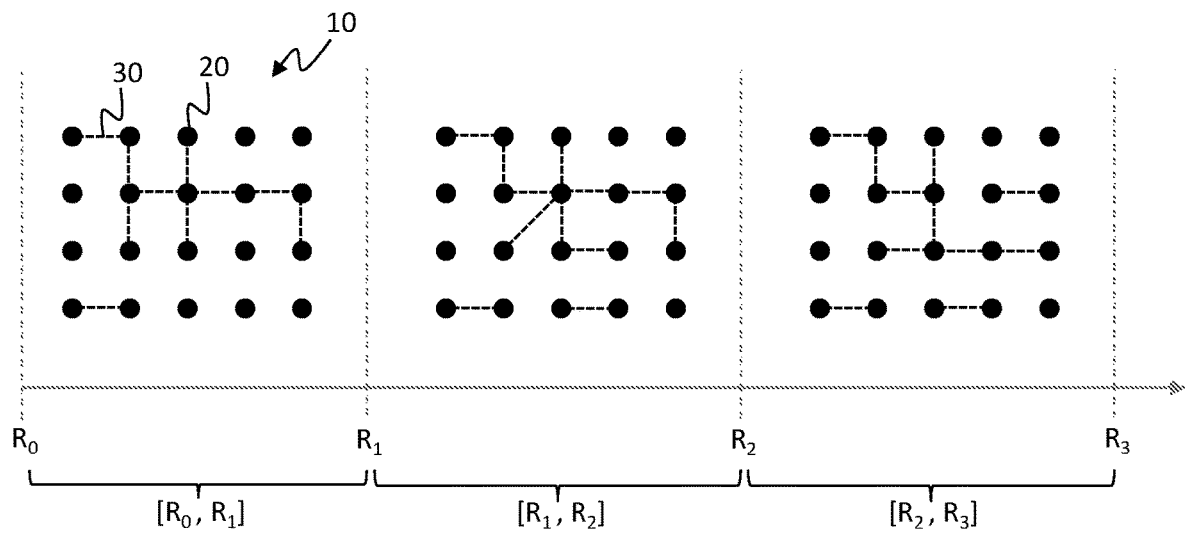

| DE | 19505905 B4 | * | 2/2007 | ........... H04B 7/1856 |
| EP | 3 616 370 | | 3/2020 | |
| JP | 2021535695 A | * | 12/2021 | |
| WO | 2018/200690 | | 11/2018 | |

OTHER PUBLICATIONS

Mehmet Toy Verizon Co Basking Ridge, et al., "Technical Report XXX;SG3_030-R9.4", vol. net-2030, ITU-T Draft; Study Period 2017-2020; Focus Group NET-2030; Series SG3_030-R9.4, International Telecommunication Union, May 8, 2020, 113 pages.
International Search Report for PCT/EP2021/063928 dated Jul. 5, 2021, 7 pages.
Written Opinion of the ISA for PCT/EP2021/063928 dated Jul. 5, 2021, 10 pages.

* cited by examiner

METHOD FOR ROUTING PACKETS IN A COMMUNICATION NETWORK HAVING A VARIABLE AND PREDICTABLE TOPOLOGY

RELATED APPLICATIONS

This application is the U.S. national phase of International Application PCT/EP2021/063928, filed May 25, 2021, which designated the U.S. and claims priority to French patent application FR 2005483, filed May 25, 2020, the entire contents of each of which are hereby incorporated by reference.

FIELD OF THE INVENTION

The present invention belongs to the field of routing packets of a communication stream within a network. In particular, the invention relates to a method for routing packets in a communication network having a topology that varies over time, but for which the topology remains predictable. The invention also relates to an orchestration entity of the network implementing some steps of said method.

PRIOR ART

Conventional packet routing methods, such as methods based on label switching (MPLS standing for "Multi-Protocol Label Switching"), are generally not well suited to communication networks having a high topology variability. In general, these conventional methods rely on algorithms distributed in the different nodes of the network. Each node of the network should then have a knowledge of the topology of the network and of the intelligence in order to determine which way to send a packet of the communication stream.

These conventional methods are rapidly limited in terms of complexity, responsiveness and scalability. Among the drawbacks of these conventional methods based on a distributed algorithm, it appears in particular that:
- the algorithm sometimes takes more time to converge than the duration during which the topology of the network remains fixed,
- the algorithm does not always allow meeting the service quality objectives, in particular because the different nodes cannot ensure an overall optimisation of the traffic to the extent that they do not have the means of taking into account the entire traffic demand within the network,
- it is necessary to propagate information to the different nodes of a considered path, and this propagation of information may sometimes require more time than the duration during which the existence of the path could be guaranteed.

The document "Segment Routing for effective recovery and multi-domain traffic engineering", A. Giorgetti et al., describes methods for routing data packets in a communication network based on the "Segment Routing" standardised architecture.

The patent application CN 110 518 959 A describes a low-orbit satellite network communication method based on MPLS and DTN (acronym of "Delay-Tolerant Network") technologies and aimed at improving the speed and reliability of the micro-network communication.

The document "Technical Report XXX—FG NET-2030 Report on Network2030 Architecture Framework", M. Toy et al. describes the architecture of the "Network 2030" network.

Nonetheless, none of these documents provide a solution to effectively take into account a strong variability of the topology of the communication network.

DISCLOSURE OF THE INVENTION

To overcome the drawbacks of the prior art, and according to a first aspect, a method for routing data packets within a communication network is proposed by the present invention. The network comprises several routing entities, called "nodes". Each node may be connected at least temporarily to one or more other nodes of the network. The network enables the transmission of a data packet of a communication stream between at least one first node, called "source node", and at least one second node, called "destination node", through a path connecting the source node to the destination node throughout one or more "intermediate" nodes. The network has a variable topology. This means that the availability of a connection link between two nodes of the network varies over time. In particular, the invention applies very well in the case where the duration of existence of a path between the source node and the destination node might be shorter than the duration necessary to propagate check-up information relating to changes in topology of the network to the nodes of the network. However, the variability of the topology of the network is predictable. This means that it is possible to anticipate topology changes that will take place over a given time period. The method includes the following steps:

- a determination, by an orchestration entity, of a plurality of temporary paths between the source node and the destination node for a plurality of successive time periods. Each temporary path is associated with a particular time period. Each temporary path defines, for the time period with which it is associated, a path connecting the source node and the destination node throughout one or more intermediate nodes. The existence of each temporary path is guaranteed over the time period with which it is associated. Each temporary path is defined as a function of the variable and predictable topology of the network so as to connect the source node and the destination node.
- a generation, by said orchestration entity, of at least one table of label stacks. Each label stack in the table corresponds to one of the temporary paths defined for one of said successive time periods. Each label corresponds to one of the intermediate nodes of the temporary path. Afterwards, the table of label stacks is made available to the source node.
- an encapsulation, by the source node, in each data packet transmitted over a time period, of the label stack corresponding to said time period in the table.
- a transmission of the data packet to the intermediate node corresponding to the label present at the top of the label stack.
- upon reception of each data packet by the intermediate node corresponding to the label present at the top of the label stack encapsulated in the data packet: an extraction of said label from the label stack and a transmission of the data packet to another node corresponding to the label newly placed at the top of the label stack, until the label stack is empty.

Thus, the label stack initially encapsulated in a packet by the source node is progressively unstacked as the packet progresses over the temporary path to the destination node. A data packet transmitted by the source node over a given time period will then follow the temporary path corresponding to the label stack associated with said time period. The successive use of different label stacks respectively associated with different time periods and corresponding to different temporary paths whose existence is guaranteed over each time period thus allows optimally ensuring the transmission of all of the data packets of the communication stream between the source node and the destination node.

It should be noted that the determination of the temporary paths associated with the successive time periods is done by the orchestration entity at a given time point for several successive time periods in the future. This is possible because the variability of the topology of the network is predictable. This means that it is always possible to define in advance the topology of the communication network for several future successive time periods (the topology of the network being different from one period to another). A table of label stacks could then be generated by the orchestration entity to represent these temporary paths that the packets will have to follow during future successive time periods.

These steps of determining the temporary paths and of generating the table of label stacks are implemented in a centralised manner by the orchestration entity, on the basis of information known to the orchestration entity on the upcoming topology changes of the communication network. Hence, this does not require a check-up protocol based on signalling communications with the nodes of the network.

In particular implementations, the invention may further include one or more of the following features, considered separately or according to any technically-feasible combination.

In particular implementations, the communication network includes at least a first domain and a second domain. The two domains may have different topology variabilities (this means that the order of magnitude of the frequency of the topology changes may be different between the two domains). Each path between the source node and the destination node includes a first portion formed by one or more of the intermediate nodes belonging to the first domain and a second portion formed by one or more of the intermediate nodes belonging to the second domain. The network includes, for each portion, an input node allowing establishing a connection to said portion. The input node may correspond to the source node or to an intermediate node. The generation, by the orchestration entity, of at least one table of label stacks includes at least two generations, namely:
  A generation, by the orchestration entity, of a first table of label stacks defining, for each of a first plurality of successive time periods, a first portion of a temporary path between the source node and the destination node. This first portion defines a temporary path between an input node to the first portion and an input node to a second portion of the temporary path. This first portion is defined as a function of the variable and predictable topology of the network so as to connect the input node to the first portion and the input node to the second portion.
  A generation, by the orchestration entity, of a second table of label stacks defining, for each of a second plurality of successive time periods, said second portion of the temporary path. This second portion is defined as a function of the variable and predictable topology of the network so as to connect the input node to the second portion and the destination node.
The routing method further includes:
  A supply of the first table of label stacks at the input node to the first portion.
  A supply of the second table of label stacks at the input node to the second portion.
A label positioned at the base of a label stack of the first table is a pointer identifying the second table of label stacks.

Such arrangements allow on the one hand taking account of the differences in topology variability of each domain, and on the other hand limiting the size of the routing information encapsulated in a data packet.

In particular implementations, the communication network is a satellite communication network including at least one spatial domain whose nodes are formed by satellites in non-geostationary orbit around the Earth, and at least one terrestrial domain, at least some of the nodes of which are formed by gateway stations, routers, exchange points, and/or satellite communication user terminals.

In particular implementations, an explicit type routing is used to define, in the spatial domain, at least one portion of the path between the source node and the destination node. For explicit type routing, a label is explicitly associated with each intermediate node belonging to said portion of the path.

In particular implementations, an implicit type routing is used to define, in the terrestrial domain, at least one portion of the path between the source node and the destination node. For an implicit type routing, at least one intermediate node belonging to said portion of the path is not explicitly associated with a label.

In particular implementations, the source node is a satellite communication user terminal, the destination node is an exchange point, a first portion of the path between the user terminal and the exchange point is formed in the spatial domain by one or more satellites, a gateway station acts as an input point to a second portion of the path formed in the terrestrial domain by one or more routers up to the exchange point.

In particular implementations, the source node is a first exchange point, the destination node is a second exchange point, a path between the first exchange point and the second exchange point includes a first portion in the terrestrial domain up to a first gateway station, a second portion in the spatial domain between the first gateway station and a second gateway station, and a third portion in the terrestrial domain between the second gateway station and the second exchange point.

In particular implementations, the source node is a first satellite communication user terminal, the destination node is a second satellite communication user terminal, the intermediate nodes of the path between the source node and the destination node belonging exclusively to the spatial domain.

In particular implementations, the source node is a satellite in non-geostationary orbit around the Earth and the destination node is a satellite communication user terminal or an exchange point.

In particular implementations, when at least one path portion between a current node and a next node corresponding to the label placed at the top of the label stack encapsulated in a packet received by the current node is accidentally unavailable, the method includes a step of replacing, by the current node, one or more labels placed at the top of the stack with one or more replacement labels corresponding to a backup path, said replacement labels having been determined beforehand and supplied to the current node by the orchestration entity.

In particular implementations, the routing method includes a step of generating by the orchestration entity a backup table for label stacks, said backup table being used by the source node when at least a portion of the path between the source node and the destination node becomes accidentally unavailable.

According to a second aspect, the present invention relates to an orchestration entity for routing data packets within a communication network having a variable and predictable topology. The network comprises several routing entities, called "nodes". Each node may be connected at least temporarily to one or more other nodes of the network. The network enables the transmission of a data packet of a communication stream between at least one first node, called "source node", and at least one second node, called "destination node", through a path connecting the source node to the destination node throughout one or more "intermediate" nodes. The orchestration entity is configured to:

Determine a plurality of temporary paths between the source node and the destination node for a plurality of successive time periods. Each temporary path is associated with a particular time period. Each temporary path defines, for the time period with which it is associated, a path connecting the source node and the destination node throughout one or more intermediate nodes. The existence of each temporary path is guaranteed over the time period with which it is associated. Each temporary path is defined as a function of the variable and predictable topology of the network so as to connect the source node and the destination node.

Generate at least one table of label stacks. Each label stack of the table corresponds to the temporary path associated with one of said successive time periods. Each label corresponds to one of the intermediate nodes of the temporary path.

Supply the table of label stacks to the source node.

In particular embodiments, the communication network includes at least a first domain and a second domain (the two domains may have different topology variabilities). Each path between the source node and the destination node includes a first portion formed by one or more of the intermediate nodes belonging to the first domain and a second portion formed by one or more of the intermediate nodes belonging to the second domain. The network includes, for each portion, an input node allowing establishing a connection to said portion from another portion. The input node may correspond to the source node or to an intermediate node. The orchestration entity is then configured, when generating said at least one table of label stacks, to:

Generate a first table of label stacks defining, for each of a first plurality of successive time periods, a first portion of a temporary path between the source node and the destination node, said first portion defining a temporary path between an input node to the first portion and an input node to a second portion of the temporary path. Said first portion is defined as a function of the variable and predictable topology of the network so as to connect the input node to the first portion and the input node to the second portion.

Generate a second table of label stacks defining, for each of a second plurality of successive time periods, said second portion of the temporary path. Said second portion is defined as a function of the variable and predictable topology of the network so as to connect the input node to the second portion and the destination node.

The orchestration entity is further configured to:
Send the first table of label stacks at the input node to the first portion.

Send the second table of label stacks at the input node to the second portion.

A label positioned at the base of a label stack of the first table is a pointer identifying the second table of label stacks.

According to a third aspect, the present invention relates to a communication network having a variable and predictable topology. The communication network comprises several routing entities, called "nodes". Each node may be connected at least temporarily to one or more other nodes of the network. The network enables the transmission of a data packet of a communication stream between a first node, called "source node", and a second node, called "destination node", through a path connecting the source node to the destination node throughout one or more "intermediate" nodes. The communication network includes an orchestration entity according to any one of the preceding embodiments. The source node is configured to encapsulate, during each time period, the corresponding label stack in each data packet transmitted during said time period. The intermediate node corresponding to the label present at the top of the label stack encapsulated in a data packet is configured to extract said label from the label stack and to transmit the data packet to another node corresponding to the label newly placed at the top of the label stack, until the label stack is empty.

In particular embodiments, the communication network is a satellite communication network including a spatial domain whose nodes are formed by satellites in non-geostationary orbit around the Earth, and a terrestrial domain, at least some of the nodes of which are formed by gateway stations, routers, exchange points, and/or satellite communication user terminals.

PRESENTATION OF THE FIGURES

Figure 2:
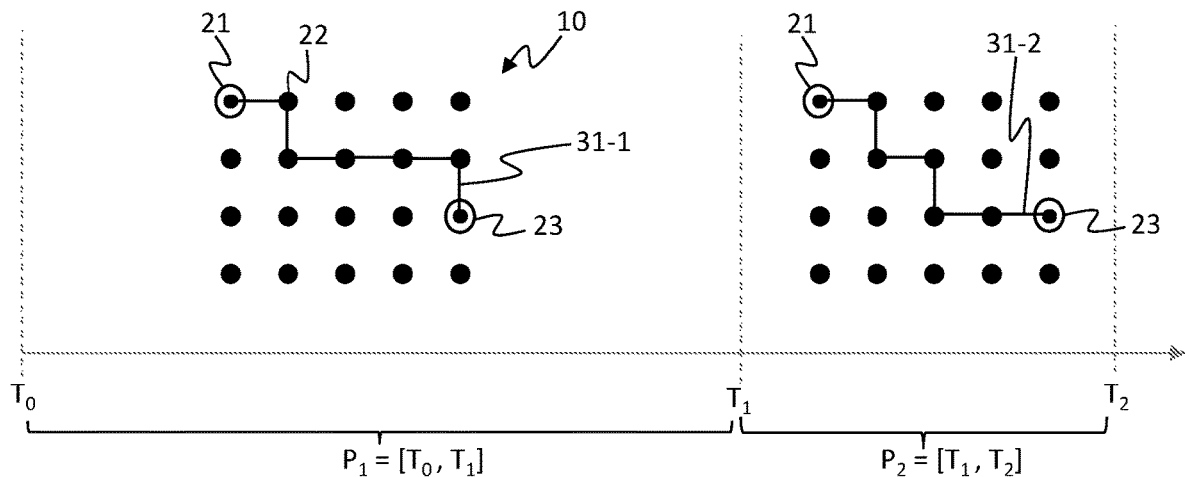
Figure 3:
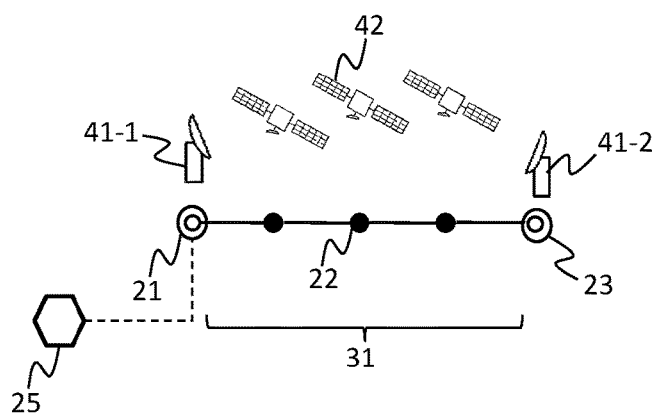
Figure 4:
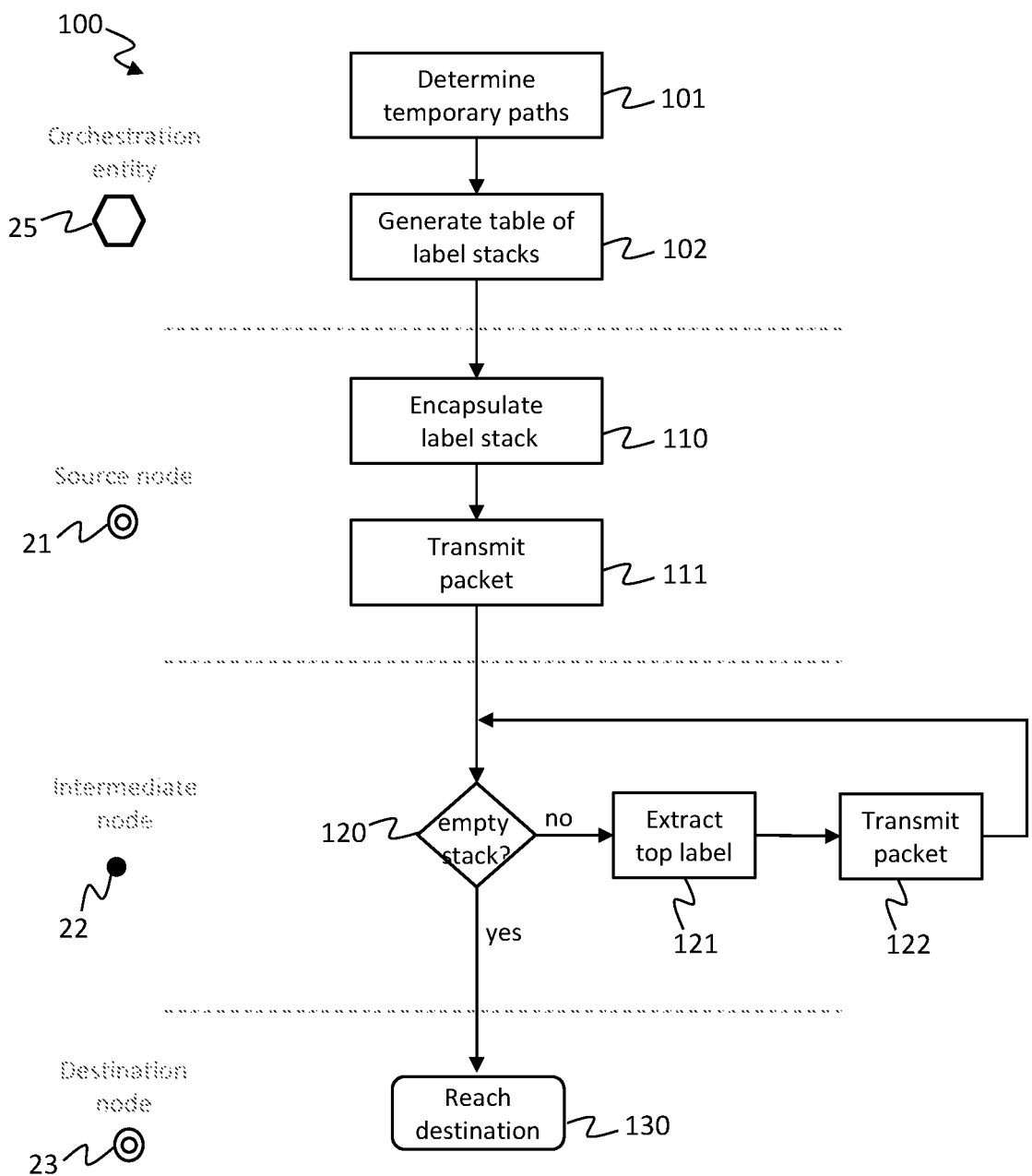
Figure 5:
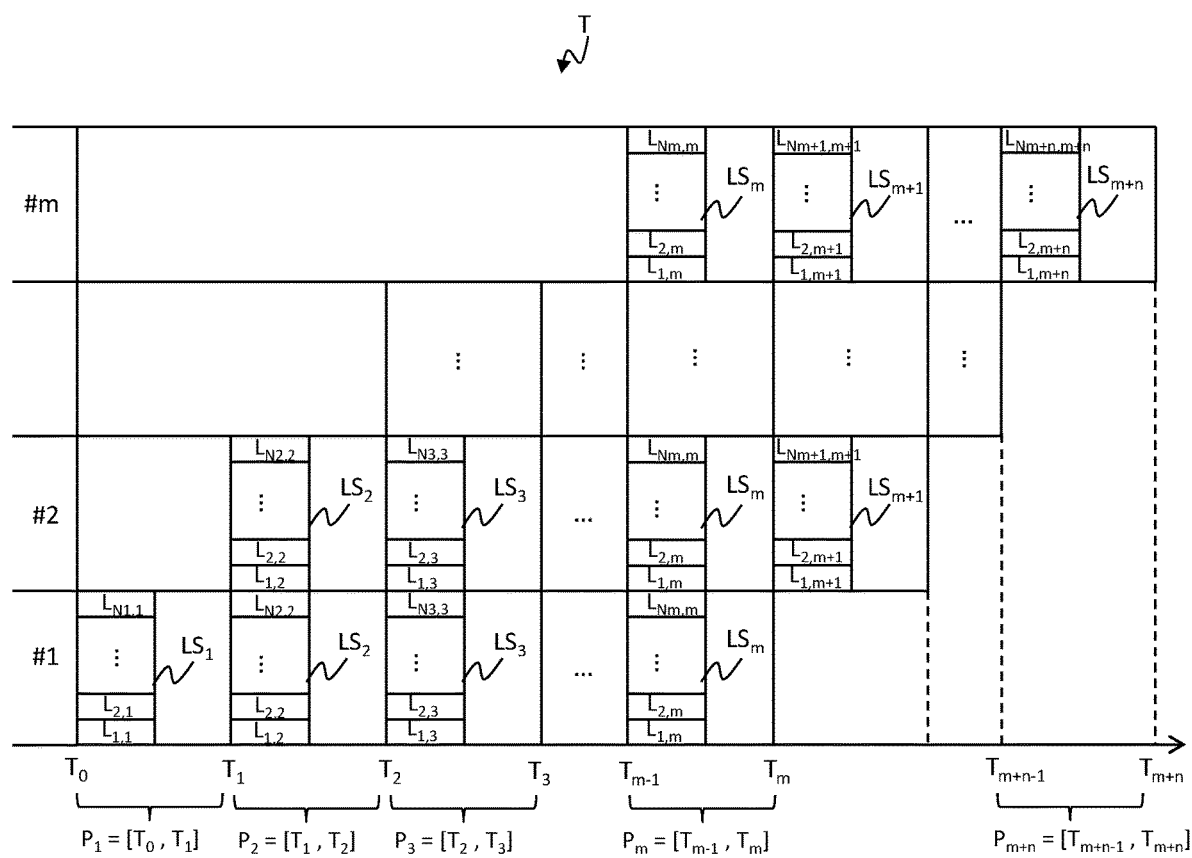
Figure 6:
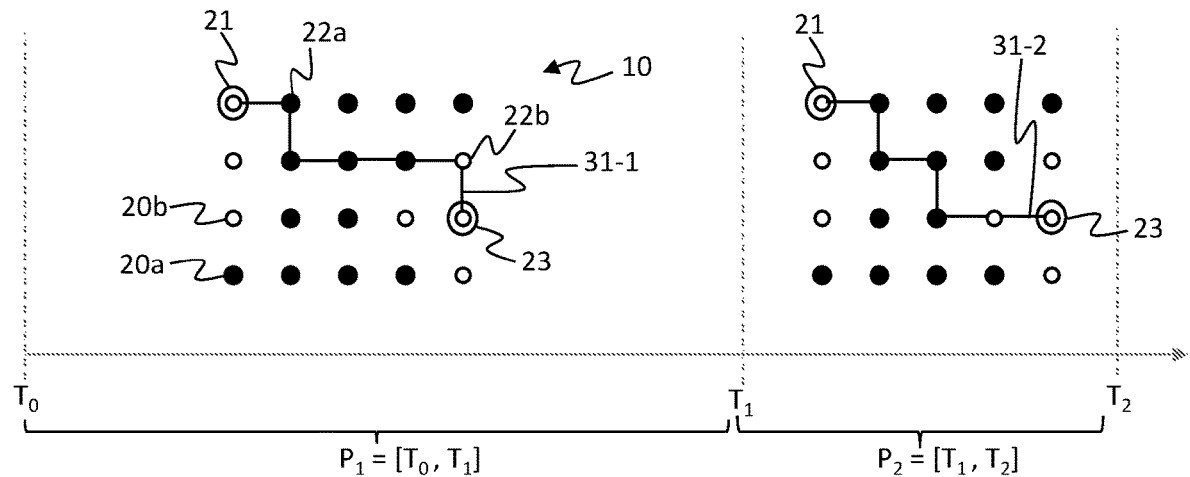
Figure 7:
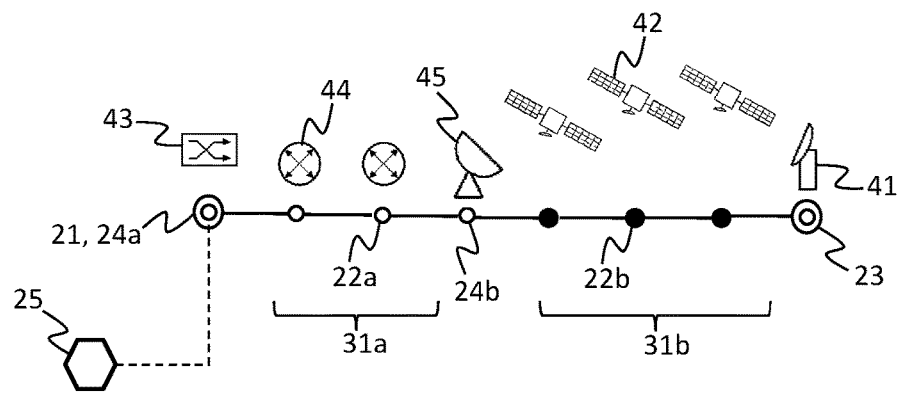
Figure 8:
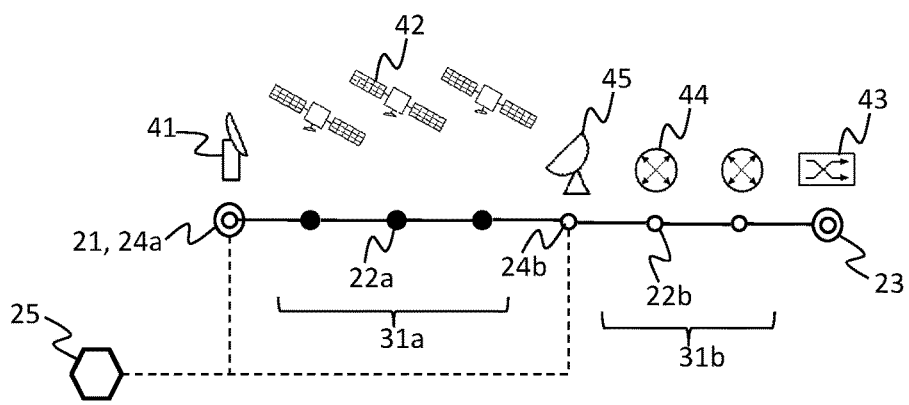
Figure 9:
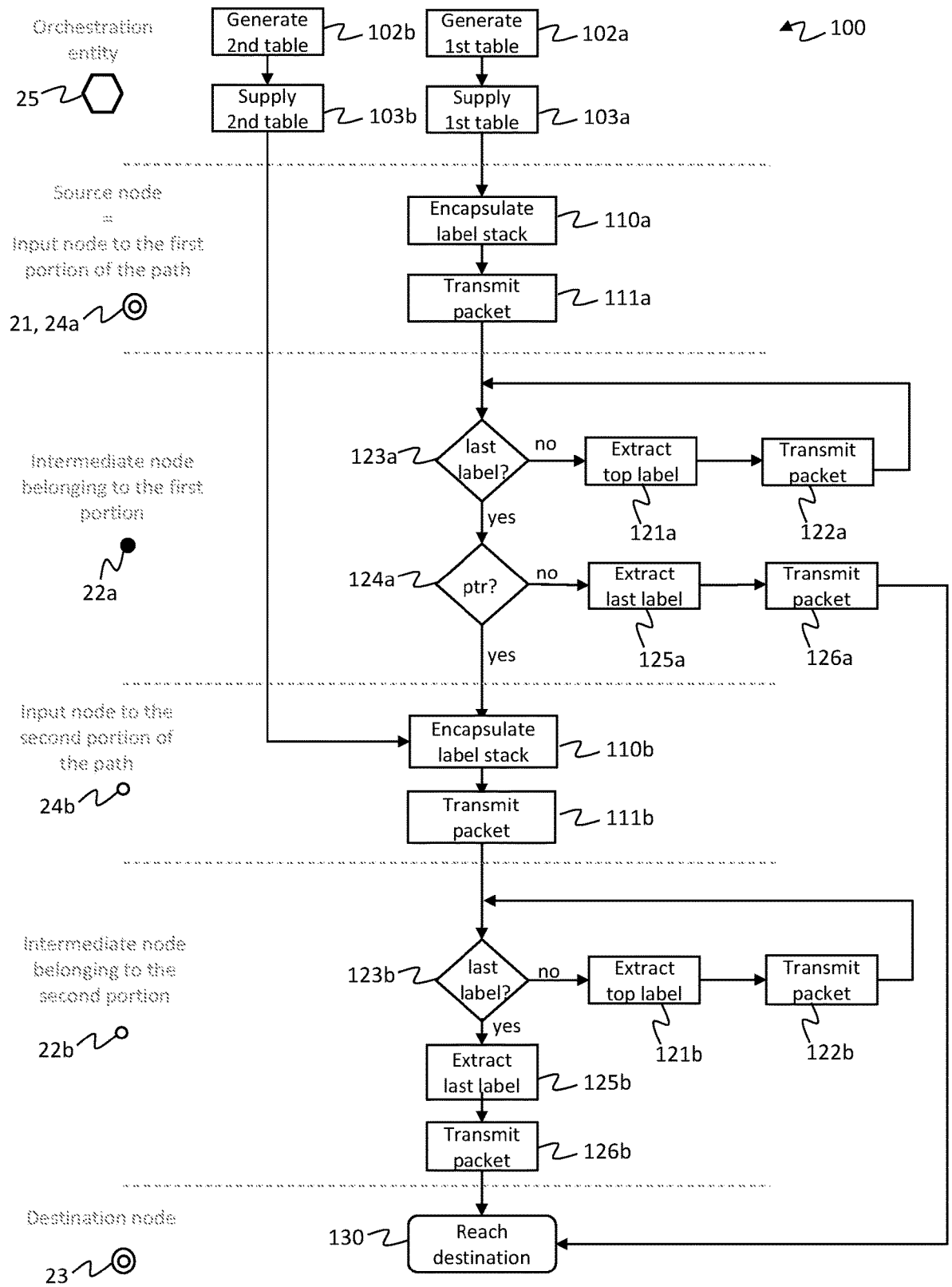
Figure 10:
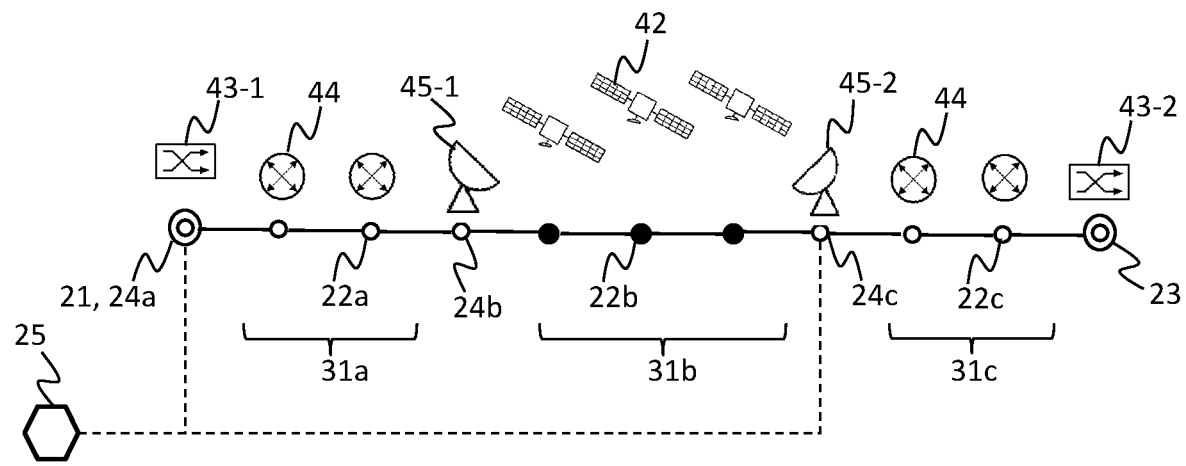
Figure 11:
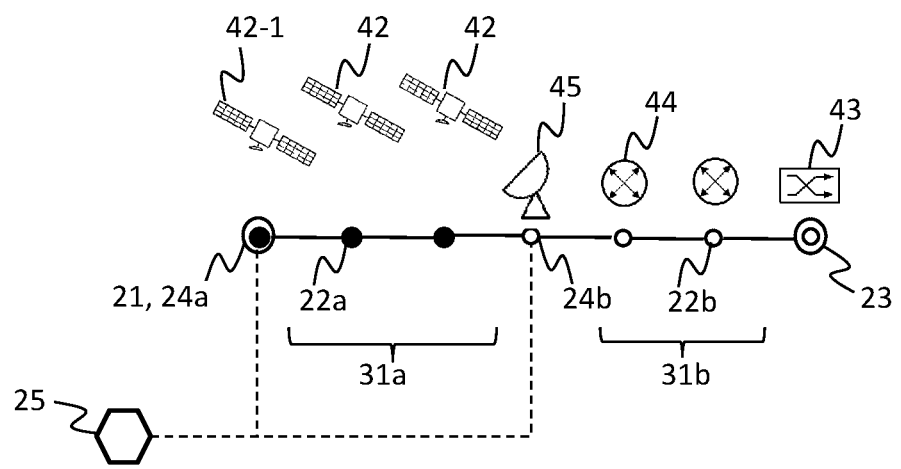
Figure 12:
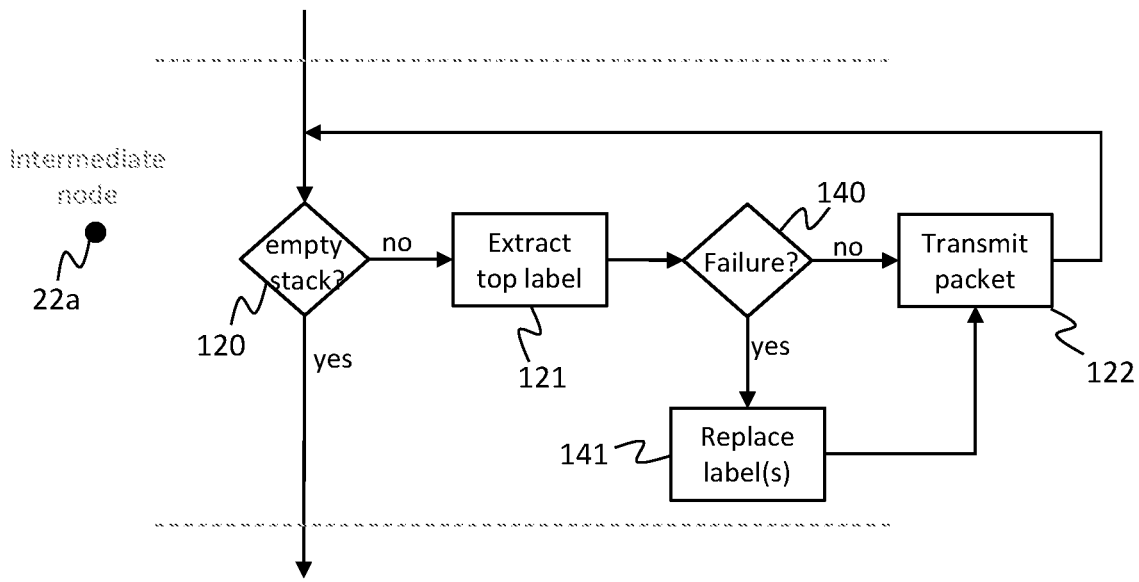
Figure 13:
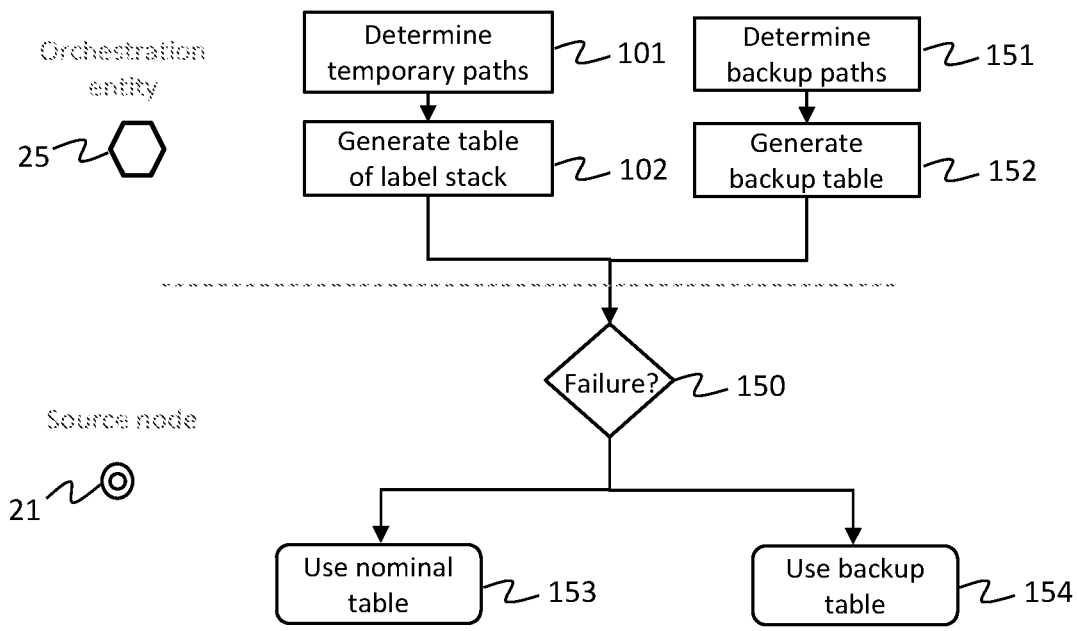

The invention will be better understood upon reading the following description, provided as a non-limiting example, and made with reference to FIGS. 1 to 13 which represent:

FIG. 1 a schematic representation of different topologies of a communication network at different successive time periods, FIG. 2 a schematic representation of different temporary paths associated with different successive time periods in a communication network whose topology varies over time, FIG. 3 an example of implementation of the invention for a communication stream between two user terminals within a satellite communication network, FIG. 4 a schematic representation of the main steps of a routing method according to the invention for routing data packets of a communication stream within a communication network having a variable and predictable topology, FIG. 5 a schematic representation of a table of label stacks respectively corresponding to different temporary paths associated with different successive time periods, FIG. 6 a schematic representation of a communication network with a variable topology including two different domains, FIG. 7 an example of implementation of the invention for a communication stream from an exchange point to a user terminal within a satellite communication network, FIG. 8 an example of implementation of the invention for a communication stream from a user terminal to an exchange point within a satellite communication network, FIG. 9 a schematic representation of the main steps of a particular implementation of a routing method according to the invention, FIG. 10 an example of implementation of the invention for a communication stream between two exchange points within a satellite communication network, FIG. 11 an example of implementation of the invention for a communication stream between a satellite and an exchange point within a satellite communication network, FIG. 12 a schematic representation of a first backup mechanism in the event of failure of a portion of a path considered for routing a communication stream, FIG. 13 a schematic representation of a second backup mechanism in the event of failure of a portion of a path considered for routing a communication stream.

In these figures, identical references from one figure to another refer to identical or similar elements. For clarity, the represented elements are not necessarily to the same scale, unless stated otherwise.

DETAILED DESCRIPTION OF AN EMBODIMENT OF THE INVENTION

The invention applies to communication networks having a variable and predictable topology. The communication network may be considered as a set of routing entities, called "nodes". Each node may be connected at least temporarily to one or more other nodes of the network. The network allows transmitting a data packet of a communication stream from a source node to a destination node through a path connecting the source node to the destination node throughout one or more intermediate nodes. Hence, a path corresponds to a set of nodes and connections connecting these nodes in pairs from the source node up to the destination node. The topology of the network is variable to the extent that the availability of a connection link between two nodes of the network varies over time. The invention finds a particularly advantageous application in the case where the variability of the topology of the communication network is such that the duration of existence of a path between the source node and the destination node may be shorter, and possibly significantly shorter, than the duration necessary to propagate check-up information relating to changes in topology of the network to the nodes of the network. This is the case in particular if topology changes take place frequently, and/or if the extent and complexity of the network are significant. However, the topology of the communication network remains predictable. In other words, the topology changes of the communication network over time are deterministic, i.e. it is possible to anticipate the topology changes that will take place over a given period of time.

In the considered examples, the changes in topology of the network generally results from the very nature of the communication network (these are therefore generally not the consequence of a failure of the network). This is the case for example for a communication network using a constellation of satellites in non-geostationary orbit around the Earth (NGSO standing for "Non-Geostationary Satellite Orbit"). However, other examples may be reported, such as communication networks based on drones or stations placed on high-altitude platforms (HAPS standing for "High-Altitude Platform Station").

In such a communication network, in order to meet service quality requirements, it is generally necessary to guarantee routing of all of the packets of the communication stream in a predetermined time.

A communication network using a constellation of satellites in non-geostationary orbit is generally composed of a spatial domain formed by the satellites of the constellation (or possibly several spatial domains if several different constellations are involved) and of a terrestrial domain formed in particular by gateway stations, routers, exchange points towards terrestrial networks (for example the Internet) and/or satellite communication user terminals (VSAT standing for "Very Small Aperture Terminal"). In such a communication network, the variability of the topology is particularly strong at the boundary between the spatial domain and the terrestrial domain. The duration during which a satellite in non-geostationary orbit is visible by a ground station depends on numerous parameters such as the altitude and the elevation of the satellite or the performances of the antennas of the satellite and of the ground station. For example, a communication satellite located at an altitude of 1,300 km will be visible by a ground station only for a few minutes.

A path between the source node and the destination node may comprise a portion in the spatial domain and a portion in the terrestrial domain. The portion in the spatial domain may include several satellites connected via inter-satellite links. In such a case, the period of visibility of the satellite at the input of the spatial portion by a ground station may be different from the period of visibility of another satellite at the output of the spatial portion by another ground station. In such a case, the validity period during which a complete path from the source node up to the destination node remains valid then corresponds to the shortest visibility period among the two mentioned visibility periods. During this validity period, it could be considered that the topology of the network does not change for the considered communication stream. However, the duration of this validity period could be not long enough to enable the transmission of all of the packets of the communication stream.

It should further be noted that such a communication network may include several hundreds, and possibly several thousands, of satellites and several millions of user terminals.

The present invention applies to communication networks whose topology is variable and predictable. The notion of variability of the topology of the communication network may be represented by a set of graphs as illustrated in FIG. 1. Each graph includes nodes 20 corresponding to routing entities of the communication network 10, as well as connection links 30 connecting nodes 20 in pairs. In FIG. 1, time is represented along a horizontal axis, and time is divided into several time periods. During each time period, the topology of the communication network 10 is static, i.e. the topology of the communication network 10 remains fixed. In other words, there are topology changes of the communication network 10 from one period to another, but there is no topology change within a period. In the example illustrated in FIG. 1, the communication network 10 includes twenty nodes 20. At the time point $R_0$, there are ten connection links 30 connecting some nodes 20 in pairs. There are topology changes at the time points $R_1$ and $R_2$. Hence, the topology of the communication network 10 remains static over the time periods $[R_0, R_1]$, $[R_1, R_2]$ and $[R_2, R_3]$. Nonetheless, the topology of the communication network 10 is different over these different time periods. In particular, the topology of the communication network 10 over the period $[R_1, R_2]$ is different from the topology of the communication network 10 over the period $[R_0, R_1]$: some connection links 30 have disappeared, whereas new connection links have appeared. Similarly, the topology of the communication network 10 over the period $[R_2, R_3]$ is different from the topology of the communication network 10 over the period $[R_1, R_2]$. It should be noted that the duration of the time periods [$R_0$, $R_1$], [$R_1$, $R_2$], [$R_2$, $R_3$], etc., are not necessarily identical and could vary over time.

For the invention, it is considered that the topology variability of the communication network 10 is predictable, i.e. it is still possible, as illustrated in FIG. 1, to define in advance an ordered sequence of several graphs representing the topology of the communication network 10 over several successive time periods.

To transmit a set of data packets corresponding to a communication stream between a first node, called "source node", and a second node, called "destination node", one should establish within the communication network 10 a path connecting the source node to the destination node throughout one or more intermediate nodes. Because of the topology changes of the communication network 10, the existence of this path could however be guaranteed only for a given period of time. The duration of the time period during which the existence of a path between the source node and the destination node could be guaranteed can however be shorter than the duration necessary for transmitting all of the data packets of the communication stream. Also, the duration of existence of a path between the source node and the destination node may be shorter than the duration necessary for propagating check-up information relating to changes in topology of the network to the nodes of the network. In this case, one should define several temporary paths respectively corresponding to several successive time periods so that, during each time period, the existence of the temporary path is guaranteed.

This is illustrated by FIG. 2 which schematically represents two temporary paths 31-1 and 31-2 connecting a source node 21 to a destination node 23 throughout several intermediate nodes 22 for two successive time periods $P_1$ and $P_2$, for the communication network 10 illustrated in FIG. 1. It should be noted that the source node 21, the destination node 23 and the intermediate nodes 22 are all nodes 20 of the communication network 10. Depending on the considered communication stream, a node 20 of the communication network 10 could potentially act as a source node 21, a destination node 23 or an intermediate node 22.

The time points $T_0$, $T_1$ and $T_2$ of FIG. 2 respectively correspond to the time points $R_0$, $R_2$ and $R_3$ of FIG. 1. It should be noted that the temporary path 31-1 corresponding to the period $P_1$ is not impacted by the topology change that takes place at the time point $R_1$ because each of the six connection links 30 forming this temporary path exists throughout the entire duration of the time period $P_1$=[$T_0$, $T_1$] (because these connection links exist both during the time period [$R_0$, $R_1$] and during the time period [$R_1$, $R_2$]). During the period $P_2$=[$T_1$, $T_2$], another temporary path 31-2 comprising different connection links allows connecting the source node 21 to the destination node 23. Throughout the entire duration of the time period $P_1$, the existence of the temporary path 31-1 is guaranteed. Throughout the duration of the time period $P_2$, the existence of the temporary path 31-2 is guaranteed. The duration of each period $P_1$, $P_2$ should be longer than the duration required to transmit a data packet from the source node 21 to the destination node 23. However, the transmission of all of the packets of the communication stream between the source node 21 and the destination node 23 spreads over several successive time periods.

In the remainder of the description, reference is made as a non-limiting example to the case of a satellite communication network 10. FIG. 3 illustrates an example of a temporary path 31 established for a given period of time between a first satellite communication user terminal 41-1, acting as a source node 21, and a second satellite communication user terminal 41-2, acting as a destination node 23. In the considered example, each intermediate node 22 of the temporary path 31 corresponds to a satellite 42 of a constellation of satellites in non-geostationary orbit. As already explained before, the variability of the topology of such a communication network 10 is explained in particular by the fact that the period of visibility of a satellite 42 by a user terminal 41-1, 41-2 has a relatively short duration that might be shorter than the duration necessary to transmit all of the data packets of a communication stream between the two user terminals. For example, the user terminals 41-1, 41-2 correspond to "very small aperture terminals" (VSAT for "Very Small Aperture Terminal"), i.e. satellite communication terminals which use, on the ground, directional parabolic antennas whose diameter is generally less than three meters.

As illustrated in FIG. 3, at least one orchestration entity 25 having a holistic knowledge of the topology of the communication network 10 and of its variability over time is used to define a routing of the data packets so that the communication stream between the source node and the destination node is transmitted while meeting a given service quality. It could be considered to use several orchestration entities organised collaboratively, hierarchically, or in a hybrid manner both collaboratively and hierarchically, to share knowledge of the topology of the communication network 10 and its variability over time.

For example, an orchestration entity 25 includes one or more processors and storage means (magnetic hard disk, electronic memory, optical disk, etc.) in which a computer program product is stored in the form of a set of program code instructions to be executed to implement some steps of the routing method according to the invention. Alternatively or complementarily, the orchestration entity 25 includes one or more programmable logic circuits (FPGA, PLD, etc.), and/or one or more application-specific integrated circuits (ASIC), and/or a set of discrete electronic components, etc.

In the considered example, in order to be able to determine the changes in topology of the communication network 10 over time, the orchestration entity 25 knows for example the orbital parameters of the satellites 42 and the geographical positions of the user terminals 41-1, 41-2.

Similarly, the different nodes (source node, destination node, intermediate nodes) also include software and/or hardware means for implementing some steps of the routing method according to the invention.

FIG. 4 schematically illustrates the main steps of a routing method 100 according to the invention for routing packets of a communication stream between a source node 21 and a destination node 23 of the communication network 10.

In particular, the method 100 includes a step of determining 101, by the orchestration entity 25, a temporary path 31 between the source node 21 and the destination node 23 for each of a plurality of successive time periods $P_1$, $P_2$, ..., $P_i$, ..., etc. A temporary path 31 defines, for a particular time period $P_i$, a path connecting the source node 21 and the destination node 23 throughout one or more intermediate nodes 22. During the time period $P_i$, the existence of said path is guaranteed, and at least one data packet could be transmitted from the source node 21 to the destination node 23. Thus, different temporary paths 31 are defined for the different time periods $P_i$, and each temporary path 31 is associated with a particular time period $P_i$.

In particular, the method 100 includes a step 102 of generating, by said orchestration entity 25, a table of label stacks. Each label stack of the table corresponds to the temporary path 31 defined for one of said successive time periods $P_i$. Each label of a label stack corresponds to a node of the temporary path 31.

It should be noted that different methods may be considered for assigning labels. For example, if an explicit routing method is used, a label is explicitly associated with each intermediate node 22 belonging to the temporary path 31. The path 31 is then entirely defined by a label stack.

According to another example, if an implicit routing method is used, at least one intermediate node 22 belonging to the temporary path 31 is not explicitly associated with a label of the label stack. In other words, with an implicit routing, a label processed by an intermediate node 22 does not necessarily correspond to an adjacent node, and the intermediate node 22 has to define itself a subpath to the node corresponding to said label. However, the existence of at least one such subpath should be guaranteed over the considered time period.

FIG. 5 represents a table T of stacks $LS_i$ of labels $L_{j,i}$ associated respectively with successive time periods $P_i$. For a given time period $P_i$, the stack $LS_i$ of labels $L_{j,i}$ defines a temporary path which persists throughout the duration of the period $P_i$ and which allows transmitting one or more data packets from the source node 21 to the destination node 23. Each label $L_{j,i}$ corresponds to a node of said temporary path. The stack $LS_i$ includes $N_i$ labels: $L_{1,i}, L_{2,i}, \ldots, L_{j,i}, \ldots, L_{Ni,i}$. The number $N_i$ of labels of a label stack $LS_i$ may vary from one time period $P_i$ to another. Indeed, the different label stacks $LS_i$ represent different temporary paths which may have different numbers of intermediate nodes. During the time period $P_i$, and in order to reach the destination node, a packet will successively transit through the node corresponding to the label $L_{1,i}$, the node corresponding to the label $L_{2,i}, \ldots,$ the node corresponding to the label $L_{j,i}, \ldots,$ the node corresponding to the label $L_{Ni,i}$.

In the example considered and illustrated in FIG. 5, the orchestration entity 25 is capable, at a given time point, of determining temporary paths between the source node 21 and the destination node 23 for at least m successive time periods. The orchestration entity 25 could then stack several sequences of label stacks in the table T. The first row #1 of the table corresponds to a first sequence of m label stacks $LS_1, LS_2, \ldots, LS_m$ respectively corresponding to m temporary paths for m successive time periods $P_1, P_2, \ldots, P_m$. The second row #2 of the table corresponds to the label stacks $LS_2, LS_3, \ldots, LS_{m+1}$ respectively corresponding to the temporary paths for the successive time periods $P_2, P_3, \ldots, P_{m+1}$. The row #m of the table corresponds to the label stacks $LS_m, LS_{m+1}, \ldots, LS_{m+n}$ respectively corresponding to the temporary paths for the successive time periods $P_m, P_{m+1}, \ldots, P_{m+n}$.

It should be noted that for a current node, the correspondence between a label $L_{j,i}$ and another node provides a means for reaching said other node from the current node. Thus, for a current node, a label $L_{j,i}$ could be associated with a node identifier. According to another example, a label $L_{j,i}$ could be associated with one or more connection links to be followed to reach another node.

The table T generated by the orchestration entity 25 is then made available to the source node 21. According to a first example, the table T is directly sent by the orchestration entity 25 to the source node 21. According to another example, a check-up entity may serve as an intermediary between the orchestration entity 25 and the source node 21. According to different variants, the source node 21 may receive the different label stacks $LS_i$ one after another, or the source node 21 may receive successively sequences of label stacks corresponding to rows of the table (transmission of the table T one row after another), or the source node 21 may receive several rows of the table T simultaneously.

The source node 21 is then configured to play, for each successive time period $P_i$, the label stack $LS_i$ associated with said time period $P_i$. To this end, the routing method 100 according to the invention includes a step of encapsulating 110, by the source node 21, in each data packet transmitted during said time period $P_i$, the label stack $LS_i$ corresponding to said time period $P_i$ in the table T. For example, the GSE ("Generic Stream Encapsulation") protocol could be used to add information describing the label stack $LS_i$ in a header of the data packet.

Afterwards, the routing method 100 includes a transmission 111 of said data packet to an intermediate node 22 corresponding to the label $L_{1,i}$ present at the top of the label stack $LS_i$. It should be noted that in FIG. 5, the label $L_{1,i}$ present at the top of the label stack $LS_i$ (i.e. the first label to be followed to route a data packet during the time period $P_i$), is located at the bottom.

The intermediate nodes 22 of the communication network 10 are configured to route a data packet in accordance with the label stack that has been encapsulated in said packet. To this end, the routing method 100 includes, for each node that receives a data packet of the communication stream:
- a verification 120 of whether the received packet includes a non-empty label stack,
- if the label stack of the packet is empty, then the packet has arrived to destination, and the node that has received the packet corresponds to the destination node (step 130 in FIG. 5),
- if the label stack encapsulated in the packet is not empty, then the node that has received the packet is an intermediate node 22, and the method 100 includes:
    - an extraction 121 of said label from the label stack,
    - a transmission 122 of the data packet to another node corresponding to the label newly placed at the top of the label stack (if the label stack is empty after the extraction step 121, then the packet is directly transmitted to the destination node whose address is for example indicated, conventionally, in a header of the packet).

Thus, the label stack initially encapsulated in a packet by the source node 21 is progressively unstacked as the packet progresses over the temporary path to the destination node 23.

A data packet transmitted during a time period $P_i$ by the source node 21 will then follow the temporary path corresponding to the stack $LS_i$ of labels $L_{j,i}$. The successive use of different label stacks respectively associated with different time periods and corresponding to different temporary paths whose existence is guaranteed over each time period thus allows optimally ensuring the transmission of all of the data packets of the communication stream between the source node 21 and the destination node 23.

It should be noted that the steps of the routing method 100 implemented by the orchestration entity 25 could be executed in parallel with the steps implemented by the source node 21 and by the different intermediate nodes 22. Indeed, the orchestration entity 25 may take charge of updating the table T of label stacks for future time periods while the source node 21 and the intermediate nodes 22 take charge of routing the packets in accordance with the temporary path valid for a current time period. It should also be noted that the orchestration entity 25 and the source node 21 could form one and the same physical entity.

In general, the communication network 10 may include different domains having different topology variabilities. In the considered example of a satellite communications network 10, the network 10 includes a spatial domain whose nodes are formed by satellites 42 in non-geostationary orbit around the Earth, and a terrestrial domain whose nodes are formed by entities on the ground, such as user terminals, gateway stations, routers, and/or exchange points with other communication networks such as the Internet network. This is schematically illustrated in FIG. 6 in which the nodes 20a belonging to the spatial domain are represented in black whereas the nodes 20b belonging to the terrestrial domain are represented in white. A temporary path 31-1, 31-2 then includes one or more intermediate nodes 22a belonging to a first portion of the path in the spatial domain and one or more intermediate nodes 22b belonging to a second portion of the path in the terrestrial domain. It should be noted that the invention could also be applied to cases where the network includes a number of different domains greater than two.

FIG. 7 illustrates an example of implementation of the invention for a communication stream from an exchange point 43 to a user terminal 41 within a satellite communication network. Hence, the exchange point 43 acts as a source node 21 whereas the user terminal 41 acts as a destination node 23. A temporary path 31 connecting the exchange point 43 to the user terminal 41 includes a first portion 31a formed in the terrestrial domain by one or more routers 44 (corresponding to intermediate nodes 22a belonging to the terrestrial domain), and a second portion 31b formed in the spatial domain by one or more satellites 42 (corresponding to intermediate nodes 22b belonging to the spatial domain). A gateway station 45 acts as an input node 24b to establish a connection from the first portion 31a in the terrestrial domain to the second portion 31b in the spatial domain. In the example illustrated in FIG. 7, the exchange point 43 acts not only as a source node 21 but also as an input node 24a to the first portion 31a of the path in the terrestrial domain.

Furthermore, the different portions of the path 31 between the source node 21 and the destination node 23 can support different routing technologies. For example, an implicit type routing is used to define the first portion 31a of the path corresponding to the terrestrial domain (for an implicit type routing, at least one intermediate node 22a belonging to said first portion of the path is not explicitly associated with a label), whereas an explicit type routing is used to define the second portion 31b of the path corresponding to the spatial domain (for an explicit type routing, a label is explicitly associated with each intermediate node 22b belonging to said second portion 31b of the path).

In accordance with the routing method 100 described with reference to FIG. 4, an orchestration entity 25 generates the table of label stacks to be used to route a data packet. The table is made available to the source node 21. A label stack encapsulated in a data packet by the source node 21 then corresponds to the concatenation of a first label stack for routing the packet along the first portion according to an explicit routing, and a second label stack for routing the packet along the second portion according to an implicit routing. In such an implementation, the complexity of the routing operations supported by the gateway station 45 is relatively limited (it simply acts as an intermediate node).

However, it might be advantageous to limit the size of the routing information encapsulated in a data packet. Also, it might be advantageous to take account of the differences in topology variability of each domain.

FIG. 8 illustrates an example of implementation of the invention for a communication stream from a user terminal 41 to an exchange point 43 within a satellite communication network. Hence, the user terminal 41 acts as a source node 21 whereas the exchange point 43 acts as a destination node 23. A temporary path 31 connecting the user terminal 41 to the exchange point 43 includes a first portion 31a formed in the spatial domain by one or more satellites 42 (corresponding to intermediate nodes 22a belonging to the spatial domain), and a second portion 31b formed in the terrestrial domain by one or more routers 44 (corresponding to intermediate nodes 22b belonging to the terrestrial domain). A gateway station 45 acts as an input node 24b to establish a connection from the first portion 31a in the spatial domain to the second portion 31b in the terrestrial domain. In the example illustrated in FIG. 8, the user terminal 41 acts not only as a source node 21 but also as an input node 24a to the first portion 31a of the path in the spatial domain.

As illustrated in FIG. 9, the routing method 100 may then advantageously include at the orchestration entity:
  a generation 102a of a first table of label stacks defining, for each of a first plurality of successive time periods, a first portion 31a of a temporary path 31 between the source node 21 and the destination node 23; said first portion 31a defining a temporary path between an input node 24a to the first portion 31a and an input node 24b to a second portion 31b of the temporary path 31; the first portion 31a is determined as a function of the variable and predictable topology of the network 10 so as to connect the input node 24a to the first portion 31a and the input node 24b to the second portion 31b of the temporary path 31;
  a generation 102b of a second table of label stacks defining, for each of a second plurality of successive time periods, said second portion 31b of the temporary path 31 between the source node and the destination node; the second portion 31b is determined as a function of the variable and predictable topology of the network 10 so as to connect the input node 24b to the second portion 31b and the destination node 23;
  a supply 103a of the first table of label stacks at the input node 24a to the first portion 31a;
  a supply 103b of the second table of label stacks at the input node 24b to the second portion 31b.

In this particular embodiment, a label positioned at the base of a label stack of the first table is a pointer identifying the second table of label stacks. A label positioned at the base of a label stack of the first table corresponds to the last label of the stack to be extracted from the stack during routing of a packet along the first portion 31a of the path. The pointer identifies the second table of label stacks that should be used by the input node 24b to route the packet along the second portion 31b of the path.

In the considered example, the source node 21 corresponds to the input node 24a to the first portion 31a.

As illustrated in FIG. 9, the routing method 100 includes at the input node 24a to the first portion 31a of the path:
  an encapsulation 110a, in each data packet transmitted during a time period of the first plurality of time periods, of the label stack corresponding to said time period in the first table,
  a transmission 111a of said data packet to an intermediate node 22a corresponding to the label present at the top of the label stack.

These steps 110a and 111a are similar to steps 110 and 111 previously described with reference to FIG. 4.

Afterwards, the data packet progresses through the different intermediate nodes 22a of the first portion 31a of the path. As illustrated in FIG. 9, the routing method 100 includes at each intermediate node 22a of the first portion 31a:
- a verification 123a of whether the label present at the top of the label stack encapsulated in the data packet is the last label of the stack,
- if it is not the last label of the stack, an extraction 121a of said label and a transmission 122a of the packet to the node corresponding to the label newly placed at the top of the stack,
- if it is the last packet of the stack, a verification 124a of whether the label is a pointer,
- if the last label is not a pointer, the label identifies the last node before reaching the destination node 23, and the routing method 100 then includes an extraction 125a of this last label and a transmission 126a to the last node before reaching the destination node at step 130,
- if the last label is a pointer, the current node is actually an input node 24b to the second portion 31b of the path, and the label identifies the second table of label stacks that should be used by the input node 24b to route the packet along the second portion 31b of the path.

The routing method 100 includes at the input node 24b to the second portion 31b of the path:
- an encapsulation 110b in the data packet of the label stack corresponding to the current time period in the second table,
- a transmission 111b of said data packet to an intermediate node 22b corresponding to the label present at the top of the label stack.

Afterwards, the data packet progresses through the different intermediate nodes 22b of the second portion 31b of the path. As illustrated in FIG. 9, the routing method 100 includes at each intermediate node 22b of the second portion 31b:
- a verification 123b of whether the label present at the top of the label stack encapsulated in the data packet is the last label of the stack,
- if it is not the last label of the stack, an extraction 121b of said label and a transmission 122b of the packet to the node corresponding to the label newly placed at the top of the stack,
- if it is the last label of the stack, the label identifies the last node before reaching the destination node 23, and the routing method 100 then includes an extraction 125b of this last label and a transmission 126b to the last node before reaching the destination node at step 130.

It should be noted that the time periods of the two tables are not necessarily the same: the start times, the end times and the durations of the time periods of the first table may be different from those of the second table. This advantageously allows taking into account the difference in topology variability of the two domains (a domain having a topology that varies in a less dynamic manner could use time periods of relatively long duration compared to the duration of the time periods used for another domain whose topology varies in a more dynamic manner).

Such arrangements also allow limiting the amount of information to be encapsulated in a data packet. Indeed, at a given time point, the data packet only encapsulates the information allowing routing the packet along a portion of the path (and not all the information allowing routing the packet along the complete path).

FIGS. 8 and 9 illustrate an example for which the path 31 between the source node 21 and the destination node 23 includes two portions 31a and 31b. However, the invention also applies to cases where the path 31 between the source node 21 and the destination node 23 includes more than two portions. In particular, FIG. 10 illustrates an example where the path 31 includes three portions 31a, 31b and 31c.

FIG. 10 illustrates an example of implementation of the invention for a communication stream from a first exchange point 43-1 (corresponding to the source node 21) and a second exchange point 43-2 (corresponding to the destination node 23). The path 31 between the first exchange point 41-1 and the second exchange point 41-2 includes a first portion 31a in the terrestrial domain up to a first gateway station 45-1, a second portion 31b in the spatial domain between the first gateway station 45-1 and a second gateway station 45-2, and a third portion 31c in the terrestrial domain between the second gateway station 45-2 and the second exchange point 43-2. The first exchange point 43-1 corresponds to an input point 24a to the first portion 31a, the first gateway station 45-1 corresponds to an input point 24b to the second portion 31b, and the second gateway station 45-2 corresponds to an input point 24c to the third portion 31c.

FIG. 11 illustrates yet another example of implementation for a communication stream from a first satellite 42-1 in non-geostationary orbit around the Earth to an exchange point 43. Hence, the first satellite 42-1 acts as a source node 21 whereas the exchange point 43 acts as a destination node 23. A temporary path 31 connecting the first satellite 42-1 to the exchange point 43 includes a first portion 31a formed in the spatial domain by one or more other satellites 42 (corresponding to intermediate nodes 22 a belonging to the spatial domain), and a second portion 31b formed in the terrestrial domain by one or more routers 44 (corresponding to intermediate nodes 22b belonging to the terrestrial domain). A gateway station 45 acts as an input node 24b to establish a connection from the first portion 31a in the spatial domain to the second portion 31b in the terrestrial domain. In the example illustrated in FIG. 11, the first satellite 42-1 acts not only as a source node 21 but also as an input node 24a to the first portion 31a of the path in the spatial domain. According to a first variant, the orchestration entity 25 could supply the first satellite 42-1 with a table of label stacks in which each label stack completely defines a path from the source node to the destination node. Alternatively, according to a second variant, the orchestration entity 25 could supply a first table of label stacks to the first satellite 42-1 to define the first portion 31a of the path, and supply a second table of label stacks to the gateway station 45 to define the second portion 31b of the path (in this case, the last label extracted from a label stack of the first table is a pointer to the second table to indicate to the gateway station 45 which table to use for the second portion 31b of the path).

In the different examples described before with reference to FIGS. 3, 7, 8, 10 and 11, the spatial domain uses for example the DVB ("Digital Video Broadcasting") protocol for uplink/downlink communications to/from the satellites 42 and for communications between two satellites. In turn, the terrestrial domain may rely on a routing technology of the MPLS ("Multi-Protocol Label Switching") type. The GSE ("Generic Stream Encapsulation") protocol is used to add the information describing a label stack into a header of a data packet.

It should be noted that the examples described before with reference to FIGS. 3, 7, 8, 10 and 11 assume a direction of the communication stream from the source node 21 to the destination node 23.

Some changes in the topology of the communication network 10 might be unpredictable, for example if they result from an accidental failure of the communication network 10. This means for example that at least one path portion between a current node and a next node corresponding to the label placed at the top of the label stack encapsulated in a packet received by the current node is accidentally unavailable.

FIG. 12 illustrates a first backup mechanism, for the routing method 100 according to the invention, in the event of failure of a portion of a path considered for routing of a communication stream.

This first backup mechanism is implemented at an intermediate node 22 (current node). When it is verified, at step 120, that a received packet includes a non-empty label stack, and following the step 121 of extracting said label from the stack, the method includes a step 140 of detecting whether there is an accidental failure for at least one path portion between the current node and the next node corresponding to the extracted label. If no failure is detected, then the packet is directly transmitted at step 122 to the next node. If, on the other hand, a failure is detected, then the method includes a step 141 of replacing by the current node one or more labels placed at the top of the stack with one or more replacement labels corresponding to a backup path. The replacement labels are determined beforehand and supplied to the current node by the orchestration entity 25.

The detection of a failure may be performed via a check-up plan based on messages with acknowledgment request emitted periodically on the different connection links of the network. If a message is not acknowledged for a given period of time for a particular link, then the link is declared faulty. A routing information base ("Label Forwarding Information Base", or LFIB) of a node connected to the faulty link could then be updated by a check-up entity of said node to redirect the traffic appropriately without passing through the faulty link.

FIG. 13 illustrates a second backup mechanism, for the routing method 100 according to the invention, in the event of failure of a portion of the path considered for routing of a communication stream.

For this second backup mechanism, in parallel with the previously-described steps of determining 101 a temporary path between the source node 21 and the destination node 23 for each of a plurality of successive time periods, and for generating 102 a nominal table of label stacks respectively associated with each time period, the routing method 100 includes at the orchestration entity 25 a determination 151 of a backup path for each time period, and a generation 152 of a backup table of label stacks respectively associated with the different backup paths thus determined. This backup table is also made available to the source node 21. The method 100 then includes, at the source node 21, a detection 150 of whether at least one portion of the path between the source node 21 and the destination node 23 has become accidentally unavailable (detection of a failure). If so, then the source node 21 uses the backup table to route the data packets of the communication stream (step 154), otherwise the source node 21 uses the nominal table (step 153).

Herein again, the detection 150 of a failure may be performed via a check-up plan based on messages with acknowledgment request emitted periodically on the different connection links of the network. If a message is not acknowledged for a given period of time for a particular link, then the link is declared faulty and the information is transmitted to the source node 21. The routing method 100 could then alternatively use the nominal table or the backup table to route the data packets of the communication stream, depending on whether a failure has been detected or not on the path between the source node 21 and the destination node 23.

In particular, the first backup mechanism is advantageous when the time of transmitting to the source node 21 of information relating to a failure of the communication network 10 is too long (this might in particular be the case when the complexity of the topology of the communication network 10 is particularly high). In turn, the second backup mechanism has the advantage of reducing the complexity of the routing method 100 at the intermediate nodes 22.

The description hereinbefore clearly illustrates that, by its different features and advantages, the present invention achieves the set objectives. In particular, the invention proposes a solution for guaranteeing routing of all of the data packets of a communication stream within a network having a variable and predictable topology. The proposed solution allows limiting the complexity of the system, in particular by the centralisation of a major portion of the steps of planning the routing of the packets by an orchestration entity.

The invention claimed is:

1. A method for routing data packets within a communication network, said network comprising several nodes, each of the nodes capable of being connected at least temporarily to one or more other nodes of the nodes of the communication network, wherein the method is adapted for using the communication network with a constellation of satellites in non-geostationary orbit around the Earth, said method includes:

a determination, by an orchestration entity, of a plurality of temporary paths between at least one source node of the several nodes and at least one destination node of the several nodes for a plurality of determined successive time periods, each of the temporary paths being guaranteed for one of the time periods and determined as a function of a variable and predictable topology of the network so as to connect said source node and said destination node via one or more intermediate nodes of the several nodes during said one of the time periods, a generation, by said orchestration entity, of at least one table of label stacks, each of the label stacks of the at least one table corresponding to one of the temporary paths defined for one of said determined successive time periods between said source node and said destination node, each label corresponding to one of said intermediate nodes of the temporary path, said table of label stacks being provided to said source node, an encapsulation, by said source node, in each data packet transmitted during a time period of said determined successive time periods, of the label stack corresponding to said time period in the table, a transmission of the data packet to the intermediate node corresponding to a label present at the top of the label stack, upon reception of each data packet by the intermediate node corresponding to the label present at the top of the label stack encapsulated in the data packet, an extraction of said label from the label stack and a transmission of the data packet to another of the nodes corresponding to a label newly placed at the top of the label stack, until the label stack is empty or all labels in the label stack have been placed at the top of the label stack.

2. The routing method according to claim 1, wherein the communication network includes at least a first domain and a second domain; each of the temporary paths between said source node and said destination node including a first portion formed by one or more of the intermediate nodes belonging to the first domain and a second portion formed by one or more of the intermediate nodes belonging to the second domain; wherein the communication network including, for each of the first portion and the second portion, an input node, corresponding to the source node or to one of the intermediate nodes, allowing establishing a connection to said first or second portion; wherein said generation of at least a first table and a second table of label stacks including at least two generations, which include: a generation, by the orchestration entity, of the first table of the label stacks defining, for each of a first plurality of the determined successive time periods, the first portion of the temporary path between the source node and the destination node, said first portion being determined as a function of the variable and predictable topology of the network so as to connect an input node to the first portion and an input node to a second portion of said temporary path, and a generation, by the orchestration entity, of the second table of the label stacks defining, for each of a second plurality of the determined successive time periods, said second portion of the temporary path, said second portion being determined as a function of the variable and predictable topology of the network so as to connect the input node to the second portion and the destination node, the routing method further including: a supply of the first table of the label stacks at the input node to the first portion, a supply of the second table of the label stacks at the input node to the second portion; and wherein the label positioned at a base of the label stack of the first table is a pointer identifying the second table of the label stacks.

3. The routing method according to claim 1, wherein the communication network is a satellite communication network including at least one spatial domain whose nodes are formed by the satellites in non-geostationary orbit around the Earth, and at least one terrestrial domain at least part of the nodes of which are formed by gateway stations, routers, exchange points, and/or user terminals for satellite communication.

4. The routing method according to claim 3, wherein an explicit type routing is used to define, in said at least one spatial domain, at least one portion of the temporary path between the source node and the destination node, wherein for an explicit type routing a label is explicitly associated with each of the intermediate nodes belonging to said at least one portion of the temporary path.

5. The routing method according claim 3, wherein an implicit type routing is used to define, in said at least one terrestrial domain, at least one portion of the temporary path between the source node and the destination node, wherein for an implicit type routing at least one of the intermediate nodes belonging to said portion of the temporary path is not explicitly associated with one of the labels.

6. The routing method according to claim 3, wherein the source node is a satellite communication user terminal, the destination node is an exchange point, a first portion of the temporary path between the user terminal and the exchange point is formed in the at least one spatial domain by one or more satellites, a gateway station serves as an entry point to a second portion of the path formed in the terrestrial domain by one or more routers up to the exchange point.

7. The routing method according to claim 3, wherein the source node is a first exchange point, the destination node is a second exchange point, the temporary path between the first exchange point and the second exchange point includes a first portion in the terrestrial domain up to a first gateway station, a second portion in the at least one spatial domain between the first gateway station and a second gateway station, and a third portion in the terrestrial domain between the second gateway station and the second exchange point.

8. The routing method according to claim 3, wherein the source node is a first satellite communication user terminal, the destination node is a second satellite communication user terminal, the intermediate nodes of the temporary path between the source node and the destination node belonging exclusively to the at least one spatial domain.

9. The routing method according to claim 3, wherein the source node is a satellite in non-geostationary orbit around the Earth and the destination node is a satellite communication user terminal or an exchange point.

10. The routing method according to claim 1, wherein, when at least one portion of the temporary path between a current node and a next node corresponding to the label placed at the top of the label stack encapsulated in a packet received by the current node is accidentally unavailable, the method includes a replacement by the current node of one or more labels placed at the top of the stack by one or more replacement labels corresponding to an emergency path, said replacement labels having been determined beforehand and supplied to the current node by the orchestration entity.

11. The routing method according to claim 1, further including a generation by the orchestration entity of an emergency table of label stacks, said emergency table being used by the source node when at least one portion of the temporary path between the source node and the destination node accidentally becomes unavailable.

12. A system comprising:
an orchestration entity for routing data packets within a communication network comprising several nodes, each node capable of being connected at least temporarily to one or more other nodes of the communication network, said orchestration entity adapted for the communication network using a constellation of satellites in geostationary orbit around the Earth, and that the orchestration entity is configured to: determine a plurality of temporary paths between at least one source node and at least one destination node for a plurality of determined successive time periods, each temporary path being guaranteed for a time period of the determined successive time periods and determined as a function of a variable and predictable topology of the network so as to connect said source node and said destination node via one or more intermediate nodes during said time period,
generate at least one table of label stacks, each label stack of the table corresponding to one of the temporary paths defined for one of said determined successive time periods, each label in the label stacks corresponding to one of the intermediate nodes of the temporary path, and
supply said table of label stacks to said source node,
the source node is configured to:
encapsulate, in each data packet transmitted during a time period of the determined successive time periods, the label stack in the table corresponding to the time period, and
transmit the data packet to an intermediate node of the intermediate nodes corresponding to a label at top of the label stack encapsulated in the data packet, and
each of the intermediate nodes are configured to:
receive the data packet;
extract from the data packet a next label from the label stack to be placed at the top of the label stack, and transmit the data packet to another of the nodes corresponding to the next label, wherein reception, extraction and transmission of the data packet between intermediate nodes is repeated until the label stack is empty or all labels in the label stack have been placed at the top of the label stack.

13. The orchestration entity according to claim 12 for which, when the communication network includes at least a first domain and a second domain, each of the temporary paths between the source node and the destination node including a first portion formed by one or more of the intermediate nodes belonging to the first domain and a second portion formed by one or more of the intermediate nodes belonging to the second domain, the network including, for each portion, an input node, corresponding to the source node or to one of the intermediate nodes, allowing establishing a connection to said portion, the orchestration entity is configured, during the generation of said at least one table of label stacks, to: generate a first table of label stacks defining, for each of a first plurality of the determined successive time periods, a first portion of the temporary path between the source node and the destination node, said first portion being determined as a function of the variable and predictable topology of the network so as to connect an input node to the first portion and an input node to a second portion of the temporary path, and generate a second table of label stacks defining, for each of a second plurality of the determine successive time periods, said second portion of the temporary path being determined as a function of the variable and predictable topology of the network so as to connect the input node (24*b*) to the second portion and the destination node, the orchestration entity being further configured to: send the first table of label stacks at the input node to the first portion, and send the second table of label stacks at the input node to the second portion; a label positioned at the base of a label stack of the first table is a pointer identifying the second table of label stacks.

14. The communication network according to claim 12, wherein the communication network is a satellite communication network including a spatial domain whose nodes are formed by satellites in non-geostationary orbit around the Earth, and a terrestrial domain at least part of the nodes of which are formed by gateway stations, routers, exchange points, and/or user terminals for satellite communication.

\* \* \* \* \*